United States Patent [19]

Mukaimoto

[11] Patent Number: 5,087,164

[45] Date of Patent: Feb. 11, 1992

[54] APPARATUS FOR STORING ROLL MATERIALS

[75] Inventor: Kenichi Mukaimoto, Fukui, Japan

[73] Assignee: Maeda Kogyo Kabushiki Kaisha, Japan

[21] Appl. No.: 495,986

[22] Filed: Mar. 20, 1990

[30] Foreign Application Priority Data

Mar. 20, 1989 [JP] Japan .................................. 1-69000

[51] Int. Cl.⁵ .............................................. B65G 1/04
[52] U.S. Cl. ..................................... 414/282; 414/911
[58] Field of Search ........................... 414/280–282, 414/659–663, 560, 561, 911

[56] References Cited

U.S. PATENT DOCUMENTS

| | | | |
|---|---|---|---|
| 2,737,303 | 3/1956 | Held et al. | 414/281 |
| 3,337,070 | 8/1967 | Guilbert, Jr. | 414/661 |
| 4,005,786 | 2/1977 | Adelson et al. | 414/281 |
| 4,595,332 | 6/1986 | Loomer | 414/282 X |
| 4,690,611 | 9/1987 | Nobuhara | 414/661 |
| 4,720,231 | 1/1988 | Pienta | 414/560 |
| 4,778,325 | 10/1988 | Stolzer et al. | 414/282 X |
| 4,838,749 | 6/1989 | Potocjnak | 414/282 X |
| 4,932,827 | 6/1990 | Schlunke et al. | 414/911 X |

FOREIGN PATENT DOCUMENTS

| | | | |
|---|---|---|---|
| 247524 | 12/1987 | European Pat. Off. | 414/280 |
| 3642561 | 6/1987 | Fed. Rep. of Germany | 414/911 |
| 610758 | 9/1926 | France | 414/281 |
| 1432224 | 4/1976 | United Kingdom | 414/282 |

Primary Examiner—David A. Bucci
Attorney, Agent, or Firm—Staas & Halsey

[57] ABSTRACT

An apparatus for storing a plurality of rolls includes a frame having a top and a base end forming a plurality of vertical stock spaces, each having an adjacent elevating passage. Brackets are disposed in each stock space for storing rolls in a vertically stacked, horizontally oriented disposition. A rail is disposed along the top of the frame, and a pickup flatcar runs on the rail. A carrier is operatively connected to the pickup flatcar and is movable up and down the elevating passages to pick-up and store rolls individually in the stock spaces.

19 Claims, 5 Drawing Sheets

APPARATUS FOR STORING ROLL MATERIALS

BACKGROUND OF THE INVENTION

1. Field of the Invention

This invention relates to an apparatus for storing roll materials in a hangar and a pickup flatcar to be used in this apparatus, and more particularly, to a systematized novel apparatus for storing roll materials, adapted to establish an elevating passage between stock spaces of the roll material, a rail being formed perpendicular to the passage, a pickup flatcar running on the rail to the required place, wherefrom the built-in carrier in the flatcar moves up and down to position the roll material on the required place or to take it out on demand. This apparatus is thus applicable to roll materials, such as paper rolls, woven cloth rolls, roll films, steel rolls or other similar materials, and benefits the proper control of inventory stocks thereupon.

2. Description of the Related Arts

One known apparatus for storing rolls includes plural sets of shelves which are disposed face-to-face with a cage rail prepared therebetween, an entrance being formed on the upper part or the lower part of the rail while an elevator cage is established with a pallet, whereas the palletized goods are placed on the required shelf. On the contrary, when the palletized goods need to be taken out, the elevator cage is sent to the required shelf to take out the same in the palletized condition. Indeed, this art is quite adequate for box-shape materials which do not move easily.

In the past, when one prepares to store a roll of material which tends to roll and move like a paper roll, cloth roll or film roll, the material is needed to be arranged lengthwise in series. This requires some extraordinary oblong stock space accordingly and promotes poor efficiency for storing space. In addition, when such roll materials are stocked in a multi-hangar having a large number of stocking rooms opposite each other and cage rail therebetween, an extra corresponding passage to each unit room is necessary for carrying the material. This passage shall occupy a large space therewith and the efficiency of stock space is largely sacrificed.

Recently, in order to avoid the above inefficiency, a roll stocker apparatus which contains only roll materials has been developed. This roll stocker apparatus is explained as follows. A pair of endless chains is equipped oppositely in a loop for transfer. A flying ring is formed on each chain at the required pitch in order to hold the roll material by each core end. The roll material is hung by each chain and transferred by motor operation, and thus the roll material is stocked in the hanging condition.

This roll stocker apparatus, although it has merit for taking the required material out with ease on disposal, has some inevitable defects. During transferring movement, the roll material is forced to move to and fro like a pendulum so that adjoining materials may bump each other and thus damage the material itself. Because of the potential for bumping, speed of the chain movement is limited and therefore it takes a long time to use. Even if only one material is needed to be taken out therefrom, all materials on the corresponding chain orbit must be moved, which causes a large waste of energy. Of course, in order to avoid the above-mentioned bumping, the pitch between the flying rings can be widened, but this negatively influences the efficiency of stocking space.

SUMMARY OF THE INVENTION

In view of the above-mentioned circumstances, the present invention has an object to provide a practical apparatus for stocking a large number of roll materials efficiently and economically.

Another object of the present invention is to provide an apparatus for taking the required roll material out in reasonable speedy manner with ease.

A further object of the present invention is to provide an apparatus to facilitate a running passage without any dead space at all for a pickup flatcar carrying the roll material.

A further object of the present invention is to provide an apparatus wherein a storing room and the pickup flatcar cooperate together in order to realize the aforesaid objects correctly.

These and other objects are met by providing an apparatus for storing the roll material, including a hangar and a pickup flatcar, the hangar including pairs of stock spaces, each stock space of one pair facing opposedly a stock space of an adjacent pair and including plural sustaining means with brackets which sustain the both core ends of the roll material, plural pairs of the stock spaces being formed longitudinally in order to keep each roll material in parallel. An elevating passage is formed between opposing stock spaces of each adjacent pair of stock spaces, and a rail is disposed along a longitudinal direction of stock space on the upper part or lower part of stock space. A pickup flatcar moves over the rail on demand, and a carrier is built in the pickup flatcar for bringing the core of the roll material to the sustaining means. In case of placing the roll material into a storing room, the pickup flatcar is driven to the required elevating passage whereon the material is hung correctly on the sustaining means of the stock space via operation of the carrier, and in case of taking the roll material out, the pickup flatcar is driven to the required elevating passage whereon the material is taken out correctly via the carrier operation.

Other advantages and characteristics of the present invention become more apparent by the following description.

DETAILED DESCRIPTION OF THE PREFERRED EMBODIMENTS

Figure 1:
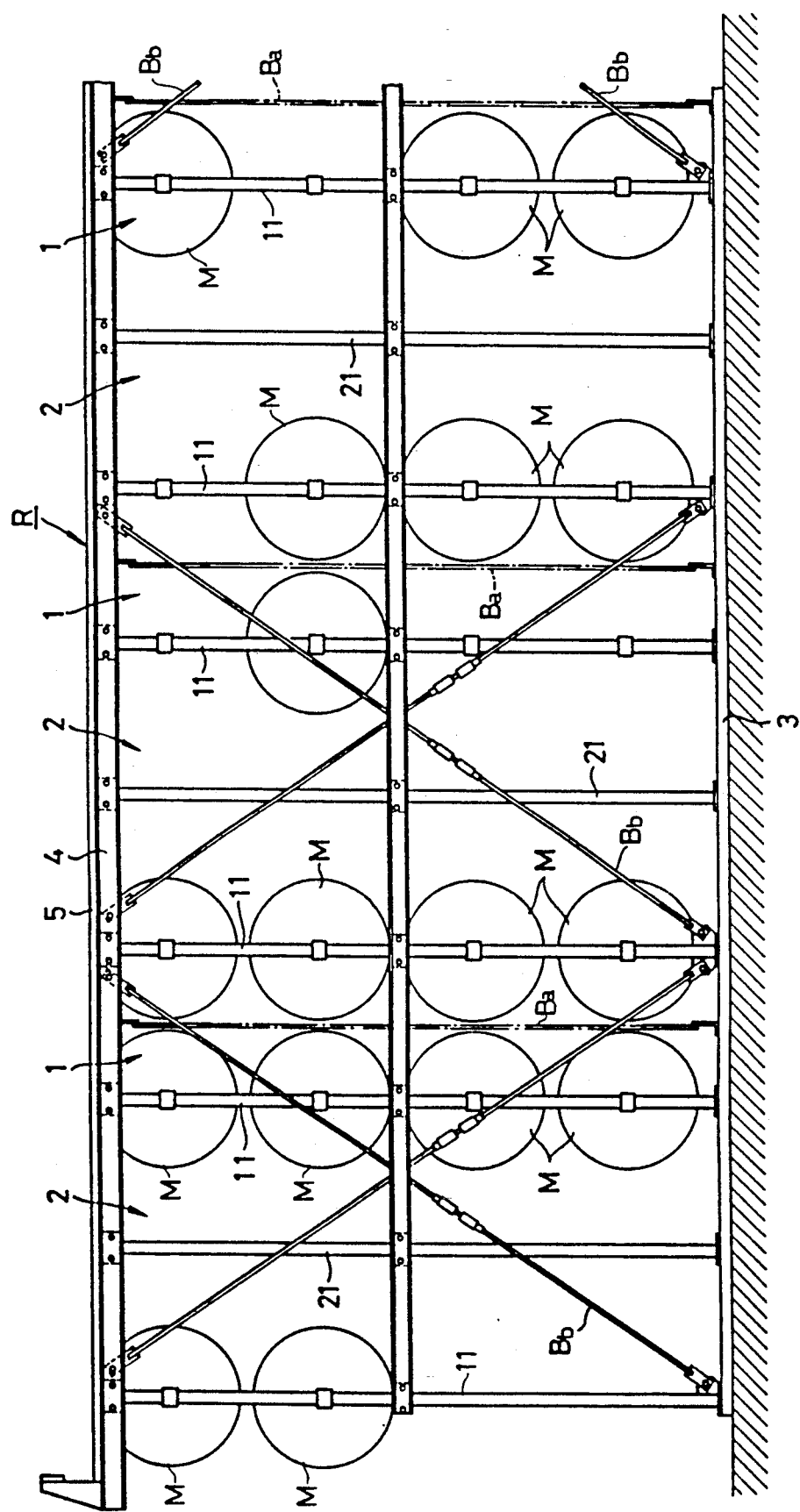
FIG. 1 is a front view of a hangar developed by an apparatus of this invention.
Figure 2:
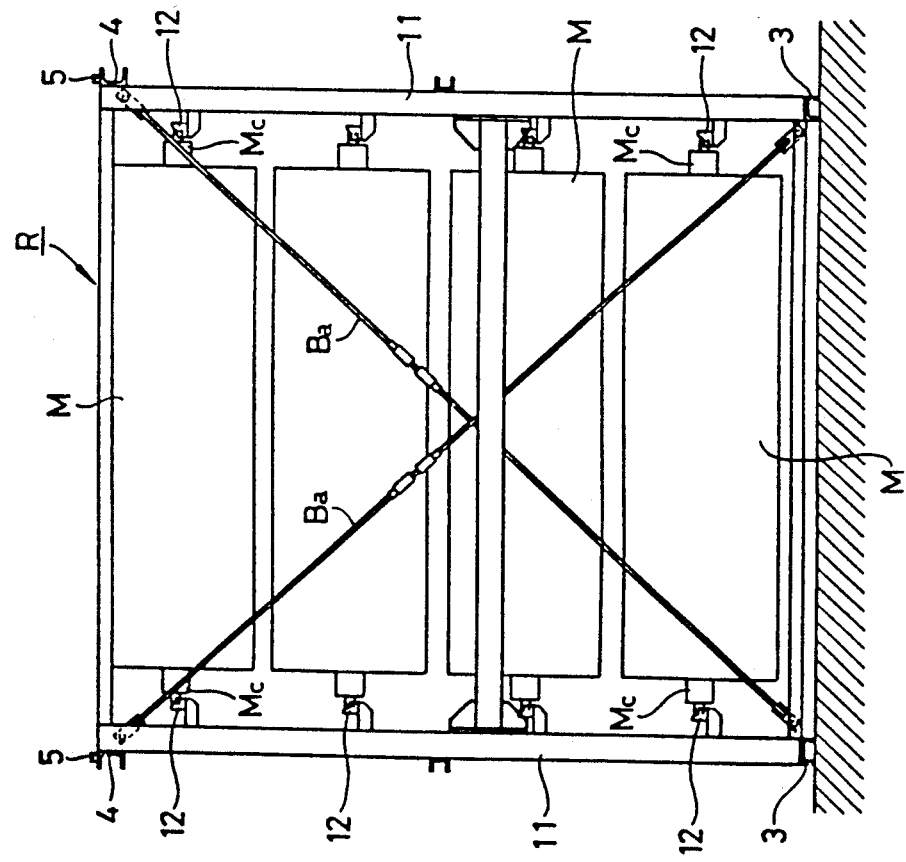
FIG. 2 a side view of FIG. 1.

With reference to FIG. 1 and FIG. 2, the letter "R" designates a hangar according to a preferred embodiment of the present invention. In this hangar (R), there are a plurality of stock spaces (1), each of which can contain plural rolls (M) of material arranged sideways, vertically stacked as in plural stories. The stock spaces (1) are arranged in pairs, with one stock space of one pair opposing or facing a stock space from an adjacent pair, so that each two opposing stock spaces shares a common elevating passage (2). The rolls (M) are piled up parallel to each other without contacting each other. The elevating passage (2) are formed in front of each stock space (1), and through the passage (2) the roll material can be moved horizontally from the stock spaces prior to lifting the rolls out. Each stock space (1) is vertically oriented between a base frame (3) of the hangar at the bottom and a beam frame (4) at the top. Sustaining pillars (11) are centered on each stock space (1), and a guide pillar (21) is centered on each elevating passage (2).

Figure 3:
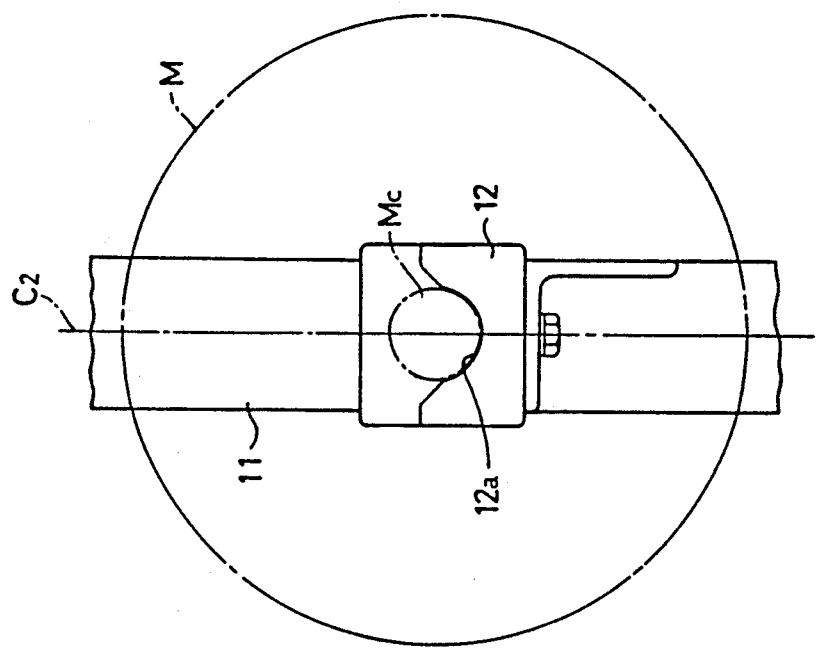
FIG. 3 is an expanded view showing a bracket of sustaining means which roll material.

For each stock space (1), the sustaining pillars (11) are disposed in pairs on opposite sides of the hangar (R) to support cores (Mc) extending from both opposite ends of each roll (M). Each pillar is L-shaped angle bar steel or "shape steel" having a strength which is precalculated to be strong enough to withstand the load value of all the rolls. The bottom end of each pillar is fixed to the base frame (3) by conventional means such as bolting or welding, while the upper end is bolted on the beam frame (4). On the inner side of the pillars (11), plural pairs of sustaining brackets (12) are formed (in the illustrated embodiment, four pairs per stack), whereas each pair supports a corresponding pair of core ends (Mc) accordingly. On each bracket (12), as shown in FIG. 3, a recess (12a) is formed in order that the core ends of the rolls are received and fitted thereupon.

At substantially the center portion of each elevating passage (2), a pair of a guide pillars (21) is provided on opposite sides of the hangar. Each pillar (21) is also made of shape steel with the same strength as the sustaining pillars (11) in order that it can stand enough weight to support the load value of a pickup flatcar (I) carrying a roll (M) of material. The bottom end is fixed on the base frame (3) while the upper end is bolted on the beam frame (4).

The numeral 5 denotes a pair of rails on which the pickup flatcar (I) runs. The rails are disposed on the beam frame (4) at direct right angles the guide pillars (21), which are centered on the elevating passages (2).

Between each pair of support pillars (11) opposing each other, a brace (Ba) is provided to firmly connect the base frame (3) and the beam frame (4), which constitutes a truss to increase strength in the horizontal direction. On the other hand, two longitudinal braces are provided diagonally each crossing together, which connects the base frame (3) and the beam frame (4) tightly. This creates a longitudinal truss to increase strength in the vertical direction.

Figure 4:
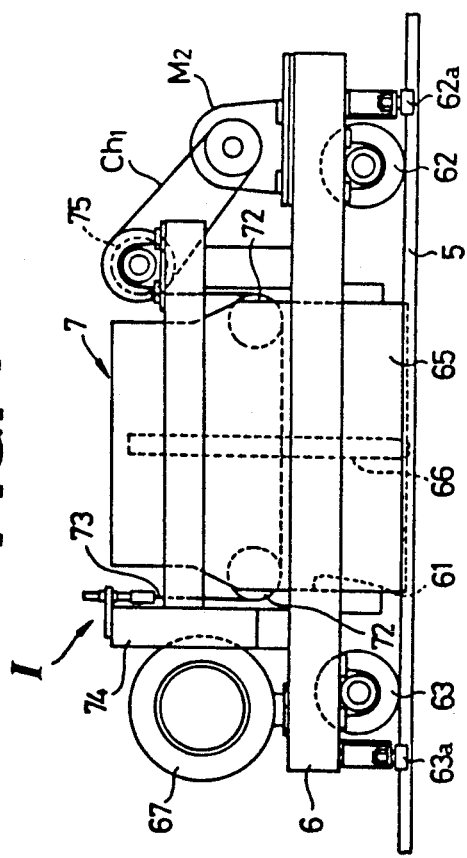
FIG. 4 is a front view of a pickup flatcar with a built-in carrier.

With reference to FIG. 4, the letter "I" denotes a pickup flatcar which transfers the roll material (M) in and out. The main body (6) of the car (I) has a loading space (61) on its central portion. The loading space receive carriage means which is movable up and down into and out of the framework. Two pairs of wheels (62) and (63) are provided to run on the rails (5).

Figure 5:
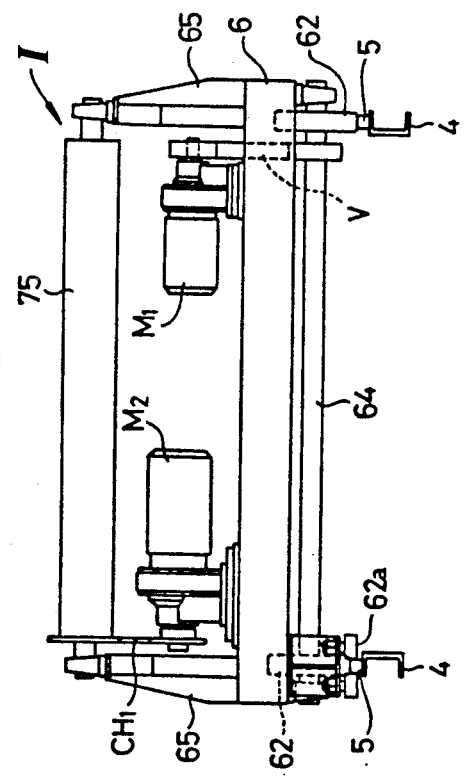
FIG. 5 is a side view of the pickup flatcar.

With reference to FIG. 5, the front wheels are driven by a driving motor ($M_1$) via a belt (V) and a shaft (64). As shown in FIG. 4 and FIG. 5, in both inner sides of the body (6), a pair of side plates (65) are provided. On the central portion of the side plate (65), a guide handle (66) is disposed longitudinally in the exact size and shape as the guide pillars (21). The handle is extended to the upper level of a guide pillar (21), and when the upper end of the guide pillar (21) and the lower end of the handle (66) contact each other, the pillar (21) and the handle (66) make one unit as if they were combined together in succession. In order to prevent derailment, two pairs of guide rollers (62a) and (63a) are disposed on the lower part of the body (6), which pinch the rail on both sides.

Figure 6:
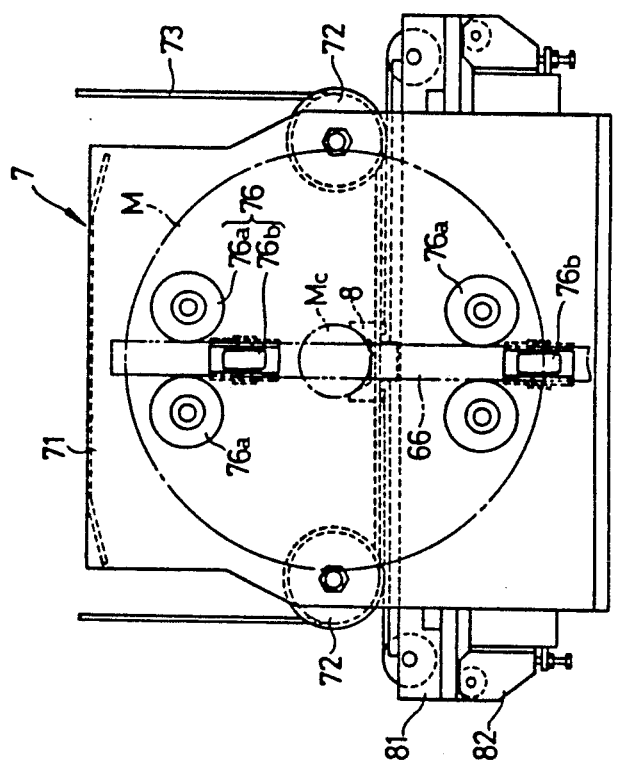
FIG. 6 is an expanded view showing the mechanism of elevating motion by a carrier built in with the pickup flatcar.

With reference to FIG. 4 and FIG. 6, the carrier (7) is placed over the loading space (61) of the pickup flatcar (I). The carrier (7) is made in a box shape which can contain the roll (M), and on both opposite axial ends means for picking up the roll are provided. The carrier is equipped with a side wall (71) which contacts with both core ends of the roll (M), and on each contacting spot, a pair of a cable pulleys (72) are set by a shaft, so as to be adapted to hang the carrier (7) from the body (6). The pulleys (72) guarantee a balance of movement for the carrier (7) as the center level of the shaft of the pulley (72) meets correctly with the holding level of the roll material (M) kept by the core bracket (8). A pair of a wire cables (73) is connected with each pair of pulleys (72) from the top part of the body (6). One end of the cable (73) is firmly fixed on the beam part (74) while the other end is wound up to a drum (75) which is driven as a winch mechanism, established on the upper near portion of the body (6).

With reference to FIG. 4 and FIG. 5, the drum (75) is supported on both sides of the body in parallel with the roll (M), and the drum (75) is connected with an elevating motor ($M_2$) by a chain ($Ch_1$) via a chain sprocket. On the outer surface of the side wall (71), a plurality of a rubber-made guide rollers (76) are fixed to hold the guide handle (66) tightly. A pair of guide rollers (76a) contacts on the outer side of the handle (66) while another pair of guide rollers (76b) contacts on the inner surface of the guide handle (66), whereas excess movement of the carrier is prevented.

Figure 7:
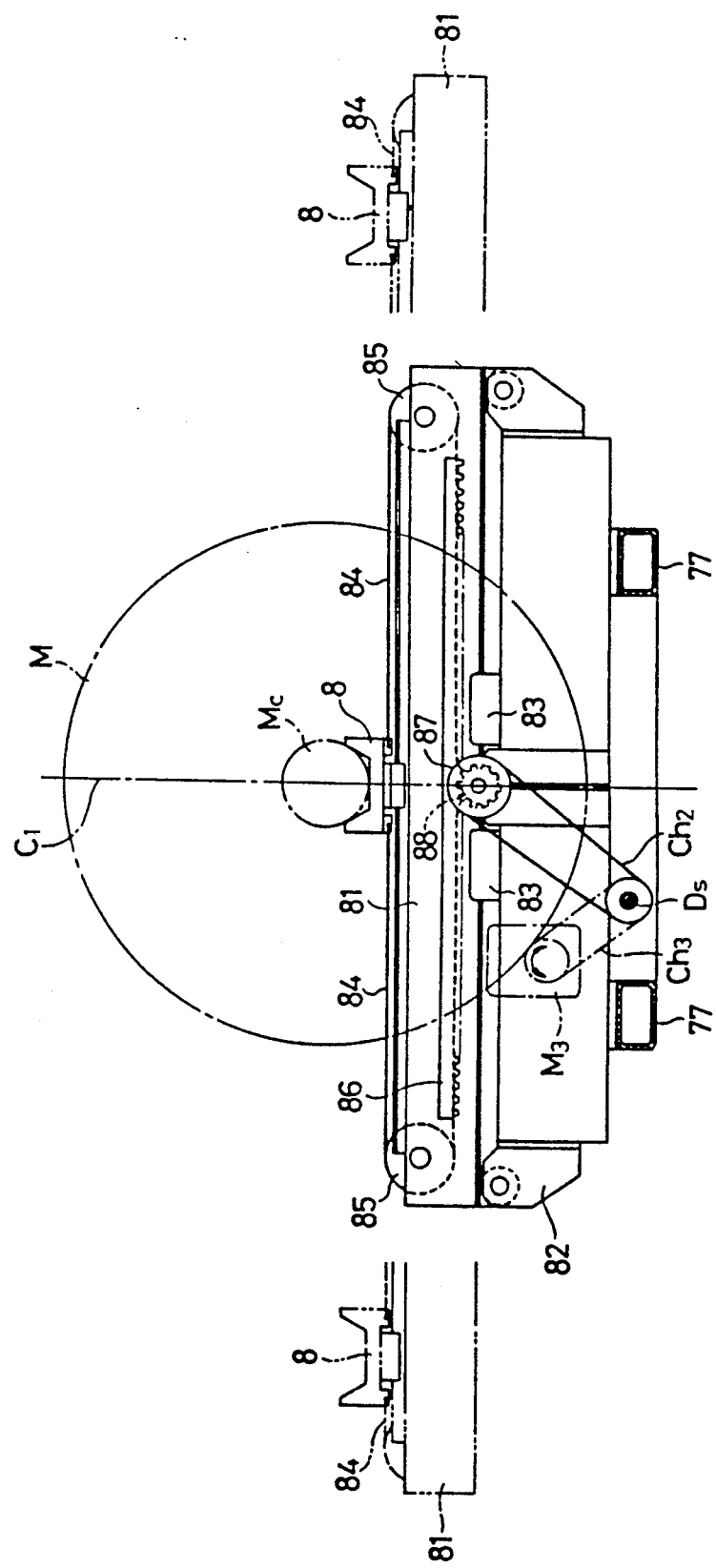
FIG. 7 is a schematic front view showing a horizontal motion mechanism by the carrier.
Figure 8:
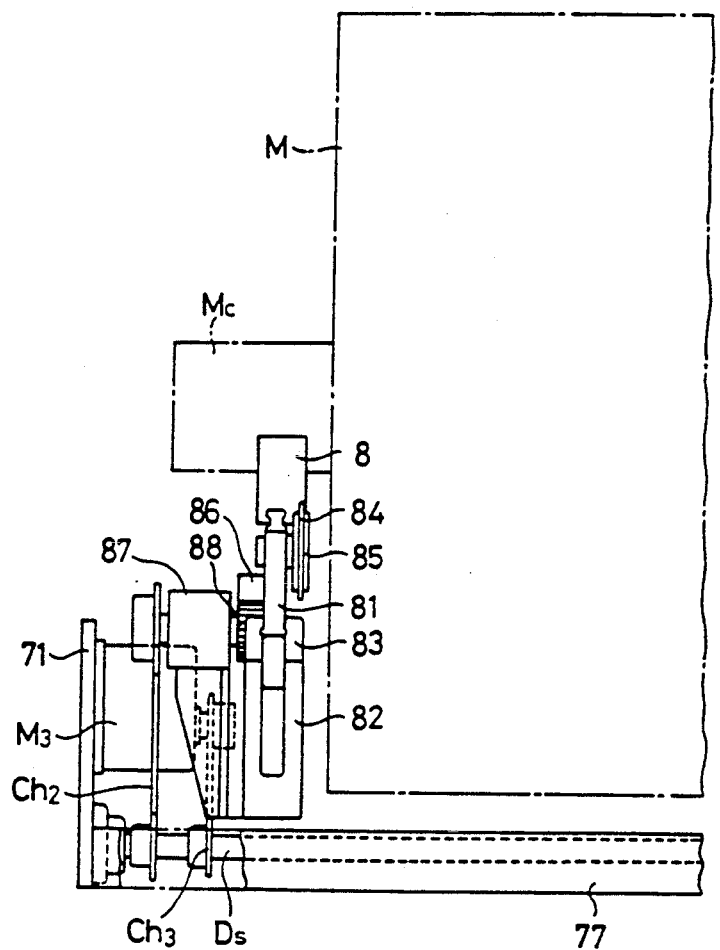
FIG. 8 a side view of the FIG. 7.

With reference to FIG. 7 and FIG. 8, the core bracket (8) provided at each end of the carriage has a recess portion in the center, slides over a pair of slide rails (81) positioned in parallel to the walls (71) in the carrier (7). With reference to FIG. 8, the slide rail (81) freely slides over a pair of guide rails (82) fixed on a base frame (77) of the carrier (7) via a pair of bearings (83). On both lower ends of the core bracket (8), a roller chain (84) has first ends connected to opposite ends of the core bracket (8), and second ends fixed on the center position of the guide rail (82). A pair of chain sprockets (85) are axially fixed at both ends of the slide rail (81). When the slide rail (81) slides horizontally over the guide rail (82), the roller chain (84) pulls the core bracket (8) in the same direction. The total length of the slide rail (81) is prearranged to slide the core bracket (8) corresponding to the slide rail (81) so that a perpendicular line ($C_1$) running through the center of the core bracket (8) as shown in FIG. 7 comes to correspond with an axial line ($C_2$) of a support pillar (21) in the stock space (1).

The sliding movement of the slide rail (81) against the guide rail (82) is operated by a pair of rack and pinion mechanisms positioned on both side walls of the carrier (7). A rack (86), fixed on the outer surface of each slide rail (81), is fitted with a pinion gear (88) formed on the center position of the guide rail (82) via the bearing (87). The pinion gear (88) is connected with a chain ($Ch_2$)

through the drive shaft (Ds) received by both side walls (71) of the carrier (7) and also through the chain sprocket. The drive shaft (Ds) is connected with a chain (Ch3) via a shift motor (M3) set on the wall (71) and via chain sprocket, and thus it is driven.

The following is a description of how to store a roll (M) into the required stock space (1):

First the driving motor (M1) is driven to move the body (6) on the rail (5) onto the place where the guide handle (66) aligns with one of the guide pillars (21) in the elevating passage (2), whereupon motor (M1) is switched off. Then, the elevating motor (M2) is driven to rotate the drum (75) to pay out wire cable (73) in the counterclockwise direction. As a result, the carrier starts to come down gradually from the load space (61) and is guided by the guide handle (66) through the guide rollers (76). The guide rollers (76) will ride on the guide pillar (21) and continue to come down in the elevating passage until the carrier (7) arrives at the level for the required stock space (1). At that point, the motor (M2) is switched off. Then, the shift motor (M3) is switched on to extend the slide rail (81) to slide into the stock space (1). In correspondence with this sliding movement the core bracket (8) will slide to move and stop almost over the sustaining bracket (12), whereupon the motor (M3) is switched off. Then, the motor (M2) is driven again to rotate in a counterclockwise direction so that the carrier (7) may come down a small amount to put the core bracket (8) onto a level of the sustaining bracket (12). Finally, the sustaining bracket (12) receives the core ends formed on the opposite ends of the roll (M).

The following is a description of how to obtain the required roll material from the stock space (1).

The reverse procedures shall be taken thereof as above explained. The core bracket (8) is placed just below the sustaining bracket (12), and the motor (M2) is driven to elevate the carrier (7) by a small amount by rotating the drum (75) in the clockwise direction so that the core bracket (8) receives both core ends of the roll correctly. Then, the motor (M3) is driven to draw the roll inwardly into the carrier (7). Then, the motor (M2) is driven again to elevate the carrier until it comes on the load space (61) of the body (6). During this procedure, the guide roller (76) guides the carrier to the guide handle (66) along the guide pillar (21).

A cord reel (67) is provided on the rear part of the body (6), and is driven by a motor (not shown on the drawing) for adjusting the length of each power cord (not shown) connected to the three motors, M1, M2, and M3, respectively.

The preferred embodiment is practiced generally as above explained, but various modifications of the preferred embodiment are contemplated by the present invention.

As one example, one extra hangar (R) is established on the present hangar (R) as so-called two-storied hangar, wherein a pickup flatcar (I) runs in the middle between the first story and the second story and the carrier (7) comes down into the first story or comes up into the second story on demand.

Figure 9:
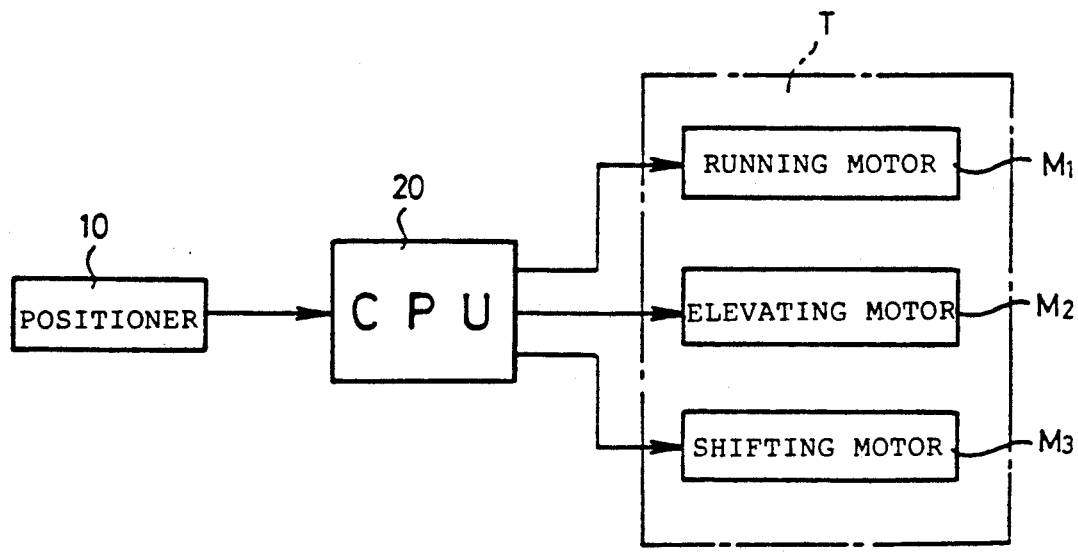
FIG. 9 is a block diagram showing an automation apparatus according to the present invention.

With reference to FIG. 9, an automation system is also applicable to this invention as another example. A positioner (10) to decide the storing address for the roll material is established; CPU (20) to control the pickup flatcar (I) and to receive the address data from the positioner (10) is established, offering a signal to operate a motor (M1) to run the pickup flatcar (I) onto the required place for the elevating passage (2), also offering the signal to operate a second motor (M2) to move the carrier (7) to work a sustaining bracket (12) for correct motion, and also offering the signal to operate a third motor (M3) to transfer a core bracket (8) onto the sustaining bracket (12). In addition, the electronic sensor is provided on the hangar (R) to control the runnings of the pickup flatcar (I), and on the body (6) an encoder is set so that the elevating level of the carrier (7) is controlled by the detection of the rolling quantity for the drum (75).

As above explained, the present invention realizes speed increase of the flatcar, that of the carrier movement, resulting in the prompt and accurate storing of roll material in the hangar or, conversely in the prompt and accurate removal of the stocked material.

According to this invention, in comparison with the prior cage rail system for the well-known multi-hangar apparatus, it greatly saves the in-site space to be used and it does not need any extra tools like a pallet or something else. On the other hand, in comparison with the prior art hangar-chain system which stores the roll material by suspending the same with the endless cain. The present invention does not result in damage caused by bumping of each material roll for storing and taking out, which offers the reasonable energy efficiency.

What is claimed is:

1. An apparatus for storing a plurality of rolls, each having two opposite axial core ends, comprising:
    a frame having a top, a base and two opposite sides and forming a plurality of stock spaces extending transversely between the two opposite sides of the frame, each stock space having an adjacent elevating passage;
    storing means disposed in each stock space for storing a plurality of rolls in a vertically stacked, horizontally oriented disposition, each roll having a longitudinal axis which is disposed transversely between the two opposite sides of the frame;
    a rail disposed along the top of the frame and being substantially perpendicular to the roll axes;
    a pickup flatcar running on the rail;
    carrier means operatively connected to the pickup flatcar and being movable up and down the elevating passages to pick-up and store rolls individually in the stock spaces,
    wherein the frame includes a plurality of vertical support pillars, and the storing means comprises plural pairs of storing brackets connected tot he support pillars at spaced intervals, each pair of storing brackets receiving the two opposite axial core ends of a roll, and
    wherein the frame further includes a plurality of pairs of guide pillars, each pair being disposed in line with the support pillars centrally in each elevating space.

2. An apparatus according to claim 1, wherein the stock spaces and support pillars are disposed in pairs, and each elevating passage is common to opposing stock spaces from adjacent pairs of stock spaces.

3. An apparatus according to claim 2, wherein the frame further includes a plurality of pairs of guide pillars each pair being disposed in line with the support pillars centrally in each elevating space.

4. An apparatus according to claim 1, wherein the frame includes brace means running between the top and the base of the frame.

5. An apparatus according to claim 1, wherein the pickup flatcar includes means for raising and lowering the carrier means.

6. An apparatus according to claim 1, wherein the pickup flatcar includes means for raising and lowering the carrier means.

7. An apparatus according to claim 6, wherein the pickup flat car includes guide means, axially alignable with the guide pillars, for guiding the carrier means up and down the elevating passages.

8. An apparatus according to claim 7, wherein the guide means includes vertical guides connected to the pickup flatcar at opposite ends and guide rollers associated with the carrier means and engageable with the guide pillars and the vertical guides.

9. An apparatus according to claim 1, wherein the carrier means includes a pair of carrier brackets and means for moving the carrier brackets laterally from the elevating passage to a corresponding stock space.

10. An apparatus according to claim 8, wherein the carrier means includes a pair of carrier brackets and means for moving the carrier brackets laterally from the elevating passage to a corresponding stock space.

11. An apparatus according to claim 9, wherein the lateral moving means comprises, for each carrier bracket, a guide rail, a slide rail slidably mounted on the guide rail, each carrier bracket being slidably mounted on each corresponding slide rail, and means for driving the slide rail along the guide rail.

12. An apparatus according to claim 11, wherein the driving means comprises a rack longitudinally disposed on the slide rail, a pinion engageable with the rack, and a motor for rotating the pinions selectively in either direction.

13. An apparatus according to claim 12, further comprises means for sliding the carrier bracket along the slide rail in response to sliding movement of the slide rail along the guide rail.

14. An apparatus according to claim 13, wherein the sliding means comprises a pair of pulleys disposed at opposite ends of the slide rail, and a chain having opposite ends connected to opposite sides of the carrier bracket to form an endless loop, and being connected to the guide rail so that sliding movement of the slide rail along the guide rail imparts sliding movement in the same direction in the carrier bracket.

15. An apparatus according to claim 10, wherein the lateral moving means comprises, for each carrier bracket, a guide rail, a slide rail slidably mounted on the guide rail, each carrier bracket being slidably mounted on each corresponding slide rail, and means for driving the slide rail along the guide rail.

16. An apparatus according to claim 15, wherein the driving means comprises a rack longitudinally disposed on the slide rail, a pinion engageable with the rack, and a motor for rotating the pinions selectively in either direction.

17. An apparatus according to claim 16, further comprises means for sliding the carrier bracket along the slide rail in response to sliding movement of the slide rail along the guide rail.

18. An apparatus according to claim 17, wherein the sliding means comprises a pair of pulleys disposed at opposite ends of the slide rail, and a chain having opposite ends connected to opposite sides of the carrier bracket to form an endless loop, and being connected to the guide rail so that sliding movement of the slide rail along the guide rail imparts sliding movement in the same direction in the carrier bracket.

19. An apparatus for storing a plurality of rolls, each having two opposite axial core ends, comprising:
  a frame having a top and a base and forming a plurality of vertical stock spaces, each having an adjacent elevating passage;
  storing means disposed in each stock space for storing rolls in a vertically stacked, horizontally oriented disposition;
  a rail disposed along the top of the frame;
  a pickup flatcar running on the rail;
  carrier means operatively connected to the pickup flatcar and being movable up and down the elevating passages to pick-up and store rolls individually in the stock spaces;
  wherein the frame includes a plurality of vertical support pillars, and the storing means comprises plural pairs of storing brackets connected to the support pillars at spaced intervals, each pair of storing brackets receiving the two opposite axial core ends of a roll; and
  wherein the frame further includes a plurality of pairs of guide pillars, each pair being disposed in line with the support pillars centrally in each elevating space.

* * * * *